April 29, 1941.   L. W. WELCH   2,240,474
HEATER STRUCTURE
Filed Dec. 20, 1939

INVENTOR.
LEWIS W. WELCH
BY
ATTORNEYS

Patented Apr. 29, 1941

2,240,474

UNITED STATES PATENT OFFICE 2,240,474

HEATER STRUCTURE

Lewis W. Welch, Detroit, Mich., assignor to Novi Equipment Company, Novi, Mich., a corporation of Michigan Application December 20, 1939, Serial No. 310,242

2 Claims. (Cl. 257—263)

This invention relates generally to vehicle heaters of the type in which air from the atmosphere is heated by the exhaust gases from the vehicle engine and refers more particularly to the outer fin assembly thereof.

In application Serial No. 205,576 filed by applicant May 2, 1938, now Patent 2,185,484, fins have been provided in their inner edges adjacent the shell with single arches for the reception of the copper used in brazing. However, when such arches were formed in the fins, the metal thereof at opposite ends of the arches is stretched and strained and this often permits the metal of the fins at such points to expand irregularly away from the inner shell during the brazing operation. As a result, they too are unsatisfactory.

In other instances, for example, in Briscoe 858,258 single openings for the copper used in brazing have been provided at the juncture of the upright and horizontal legs of the fins, however, it has been found that such structures are likewise unsatisfactory because too much of the copper melted during the brazing operation will flow into and circumferentially around the grooves formed by the upright and horizontal legs thereof, instead of between the fins and shell. Thus, that portion of the copper that would flow through the openings would be insufficient to effectively bond the parts together and the remainder of the copper flowing around the outer surface of the fins would be wasted.

In the present construction, however, the objections and disadvantages mentioned above have been overcome entirely by the provision of a fin structure that will preclude the melted copper being wasted as heretofore in the grooves of the fins and that therefore will insure complete and proper union between the parts during the brazing operation; by the provision of a fin structure that will permit even and uniform expansion throughout its circumference during the brazing operation; by providing fins that will not tilt on the inner shell and that therefore may be spaced individually apart on said shell without likelihood of angular movement relative to the shell before or during the brazing operation; and by the provision of a fin structure that will function better than any fin structure of which I am aware to engage and deflect the air passing between the inner and outer shells of the heater and to radiate to a higher degree the heat imparted thereto from the inner shell containing the exhaust gases from the engine. Thus, such fins will not only be assembled better with the inner shell but will serve also to heat better the air between the inner and outer sells of the heater.

Other objects, advantages and novel details of construction of this invention will be made more apparent as this description proceeds, especially when considered in connection with the accompanying drawing, wherein.

Figure 1:
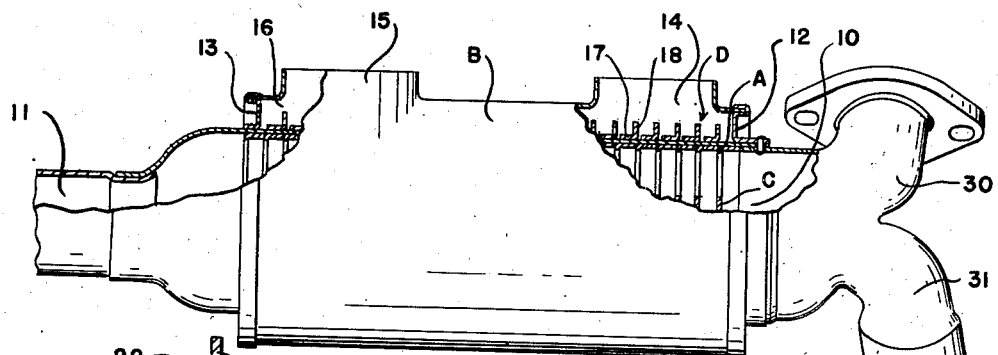
Figure 1 is a side elevation of a heater structure embodying my invention having parts broken away and in section.
Figure 2:
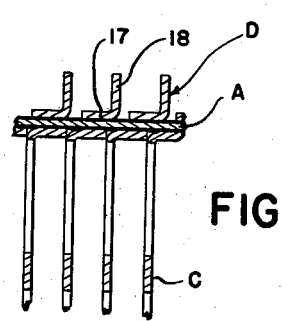
Figure 2 is an enlarged fragmentary longitudinal sectional view through the inner shell and adjacent fins.

Referring now to the drawing, A is the inner shell, B is the outer shell, C are the baffles, and D are the fins of a heater structure embodying my invention.

As shown, the inner shell A is tubular in configuration and is formed from sheet metal. Preferably the shell A is provided at one end with an inlet 10 for exhaust gases from the vehicle engine and is provided at its other end with an outlet 11 for said exhaust gases. The outer shell B is also tubular in configuration and is substantially concentric with the inner shell A. Preferably this shell B is also formed from sheet metal and is held by annular headers 12 and 13 in proper spaced relation to the inner shell A. Adjacent opposite ends of this outer shell B are openings 14 and 15 for air. Any suitable means (not shown) may be employed for conducting air from the atmosphere to the inlet opening 14 and from the outlet opening 15 to a suitable air register within the vehicle body. The baffles C are metal stampings and are spaced apart longitudinally in the inner shell A. As shown, these baffles C are suitably apertured for the passage therethrough of the exhaust gases and serve effectively to conduct heat from said gases to the walls of the inner shell A.

Figures 4, 5:
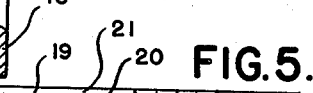
Figure 4 is a sectional view taken on line 4—4 of Figure 3.
Figure 5 is a top plan view of the fin illustrated in Figure 3.

The fins D are also metal stampings and are sleeved upon the inner shell A. Preferably these fins D are spaced apart longitudinally of the shell and serve to radiate within the air chamber 16 the heat received from the inner shell A. As shown, each fin D is an annulus and is substantially L-shape in cross section. By referring to Figure 4, it will be observed that the horizontal or attaching leg 17 of the L is substantially equal in width to the depth of the upright leg 18. At the juncture of the legs 17 and 18 with each other are two circumferentially spaced elongated openings 19 and 20 which are of sufficient width to extend upwardly into the upright leg 18 and laterally outward into the horizontal leg 17, but are narrow enough to leave solid bridge-like portions 21 and 22 respectively of the legs 18 and 17. Beginning at opposite ends of the portion 21 of the upright leg 18 and located at circumferentially spaced points of the upright leg are substantially rectangular, radially extending slots 23 that open outwardly through the outer edges of said leg. Preferably opposite side edges 24 and 25 of each radially extending slot 23 are substantially parallel so that the intermediate solid baffle portions 26 are wider at their outer than at their inner ends. In this connection it will be noted that the inner ends of these slots 23 are spaced slightly outward from the inner edge of each upright leg 18 and thus leave a circumferentially extending solid portion 27 that connects into opposite ends of the solid bridge-like portion 21 of the upright leg.

Figures 3, 6:
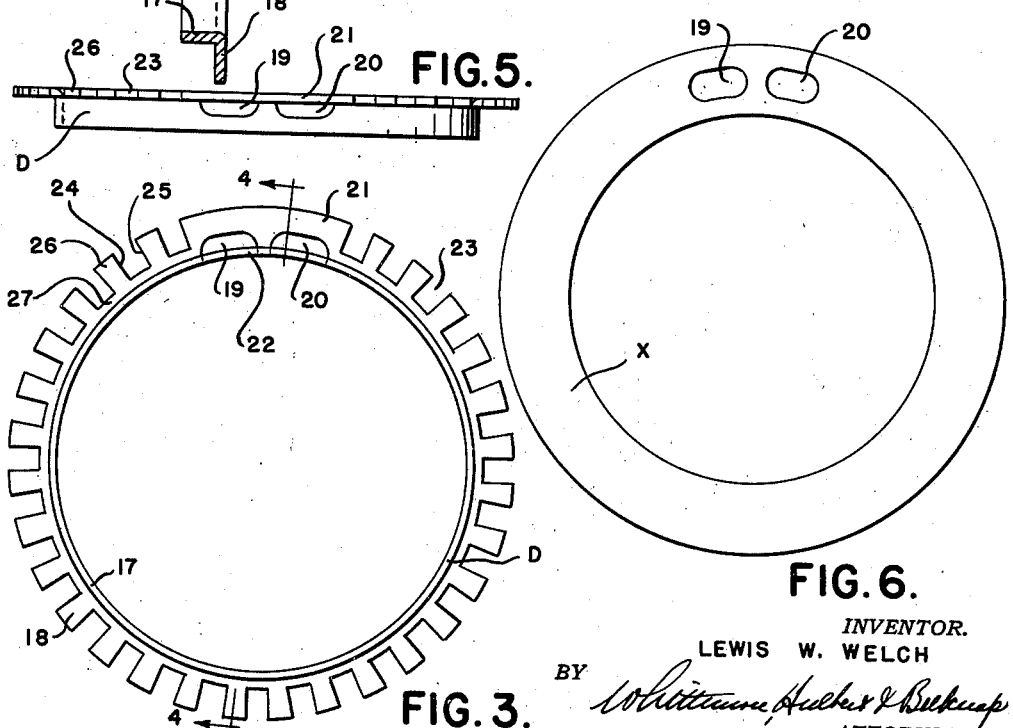
Figure 3 is a detail elevation of one of the fins.
Figure 6 is a detail view of the blank from which the fin illustrated in Figure 3 is formed.

In the process of construction the fins D are formed from flat ring-like blanks such as X shown in Figure 6. While in this form the openings 19 and 20 are punched therein, then the blank is pressed to the L-cross section. The slots 23 are then punched in the leg 18 of the L. However, if desired the slots 23 may be punched in the blank X when the openings 19 and 20 are formed therein before the blank is pressed into L-cross section.

When it is desired to assemble the fins D with the inner shell A, the fins are sleeved upon said shell so as to be spaced apart thereon. In this position the horizontal leg 17 of each fin is in surface-to-surface engagement with the shell and the upright leg 18 of each fin extends at substantially right angles to the shell. Preferably the fins D are arranged so that the openings 19 and 20 of the respective fins are in alignment. The copper used in the brazing operation is then inserted through the aligned openings 20 so as to lie flat against the solid bridge portions 22 of the horizontal legs 17 of the fins. Such copper is preferably in wire or strip form but may be any suitable form for the purpose described. The assembly is then inserted into a suitable furnace where the copper is melted. Some of this melted copper will flow through the aligned openings 20 onto the outer surface of the shell A. It will then seep between the inner surface of the horizontal legs 17 and the outer surface of the shell to assist in bonding such parts firmly together. Other portions of the melted copper will flow circumferentially of the horizontal legs 17 to and through the aligned openings 19 onto the outer surface of the shell A. It will then seep between the inner surface of the horizontal legs 17 and the outer surface of the shell to complete the bonding of such parts firmly together. Thus, with my construction none of the melted copper will be wasted. Any of it that flows circumferentially of the horizontal legs 17 will be trapped by the openings 19. As a result, a proper and complete brazing between the parts will be effected. This is particularly true inasmuch as the horizontal legs 17 of the fins are wide and afford sufficient surface-to-surface area for proper brazing. In fact, the legs 17 of the fins are wide enough to alone adequately support the fins on the shell without having to be in edge-to-edge contact with each other or otherwise braced. The bridge portions 21 and 22 cooperate with the other solid portions of the fin legs 17 and 18 to insure even and uniform expansion and contraction of the fins during and after the brazing operation, hence a proper union between the fins D and shell A is effected.

In operation, the exhaust gases from the engine will be conducted by the branches 30 and 31 of the exhaust conduit to the inlet 10 of the shell A. Such gases will then flow through the apertures in the baffles C to the outlet 11. The heat from the gases will be conducted by the baffles C to the walls of the shell A and thence via the fins D to the air in the chamber 16 between the shells A and B. The air from the atmosphere will enter this chamber 16 from the inlet 14 and will be discharged therefrom through the outlet 15. While in the chamber 16 the air will absorb the heat from the shell A and fins D. In this connection it will be appreciated that such air will be broken up by the baffle portions 26 of the fins and will flow through the slots 23 therein. As a result, the fins provide the maximum scrubbing surface for the air, consequently the maximum of heat will be absorbed by the air before it is discharged through the outlet 15.

What I claim as my invention is:

1. In a heater, a tubular shell, and a plurality of annular heat radiating fins of L-cross section sleeved on said shell, the horizontal flanges of said fins being in surface-to-surface contact with the outer surface of the shell and spaced slightly apart longitudinally of the shell so that such flanges and shell form narrow annular channels extending circumferentially of the shell between the respective fins, each horizontal and upright flange of the fins being provided at the juncture of said flanges with circumferentially spaced openings, said openings being spaced from the free edges of said upright and horizontal flanges so that solid circumferentially extending bridge-like edge portions of said flanges span said openings and cooperate with adjacent solid portions of the fins to insure substantially uniform expansion and contraction of the fins, either of the spaced openings in the upright flanges of the fins being adapted to receive a body of copper to be melted during a brazing operation, the spaced openings in the horizontal flanges of the fins being directly below and connecting into the spaced openings in the upright flanges and being at one side of and connecting into the annular channels aforesaid extending circumferentially of the shell.

2. In a heater, a tubular shell, and a plurality of annular heat radiating fins of L-cross section sleeved on said shell, the horizontal flanges of said fins being in surface-to-surface contact with the outer surface of the shell, each horizontal and upright flange of the fins being provided at the juncture of said flanges with circumferentially spaced openings, said openings being spaced from the free edges of said upright and horizontal flanges so that solid circumferentially extending bridge-like edge portions of said flanges span said openings and cooperate with adjacent solid portions of the fins to insure substantially uniform expansion and contraction of the fins, either of the spaced openings in the upright flanges of the fins being adapted to receive a body of copper to be melted during a brazing operation, the spaced openings in the horizontal flanges of the fins being directly below and connecting into the spaced openings in the upright flanges of the fins.

LEWIS W. WELCH.